United States Patent [19]

Hancart et al.

[11] 3,916,693
[45] Nov. 4, 1975

[54] DEVICES FOR CARRYING OUT A MEASURING, SAMPLING, OR TREATING OPERATION UPON A BATH OF MOLTEN METAL

[75] Inventors: Jules Octave Hancart; Philippe Alexandre Tyou, both of Liege, Belgium

[73] Assignee: Centre de Recherches Metallurgiques — Centrum Voor Research in de Metallurgie, Brussels, Belgium

[22] Filed: Nov. 16, 1973

[21] Appl. No.: 416,677

[30] Foreign Application Priority Data
Nov. 16, 1972  Belgium .............................. 791495
Nov. 23, 1972  Belgium .............................. 791835

[52] U.S. Cl. ............................ 73/423 R; 73/DIG. 9
[51] Int. Cl.² ........................................... G01N 1/12
[58] Field of Search ......... 73/423 R, 423 A, DIG. 9; 266/34 LM; 136/234

[56] References Cited
UNITED STATES PATENTS

| | | | |
|---|---|---|---|
| 2,398,958 | 4/1946 | Pellettere | 73/290 R |
| 2,891,686 | 6/1959 | Robertson | 73/290 |
| 3,635,094 | 1/1972 | Oberli | 73/423 A |
| 3,638,500 | 2/1972 | Wetzel | 73/423 R |
| 3,789,671 | 2/1974 | Larson | 73/423 R |

*Primary Examiner*—S. Clement Swisher
*Attorney, Agent, or Firm*—Holman & Stern

[57] ABSTRACT

The device includes a probe for performing a measuring, sampling, or treating operation on a bath of molten metal in a receptacle. A probe-carrier movably mounted on a support structure allows insertion of the probe into the receptacle, and its withdrawal. The following sequence of operations is carried out automatically by the device: insertion of the probe; arrest of the probe, during insertion, when the probe is at a predetermined position relative to the surface of the bath; and withdrawal of the probe when a predetermined length of time has elapsed since arresting of the probe.

10 Claims, 15 Drawing Figures

DEVICES FOR CARRYING OUT A MEASURING, SAMPLING, OR TREATING OPERATION UPON A BATH OF MOLTEN METAL

This invention relates to devices for carrying out measuring, sampling, and treating operations upon baths of molten metal in a receptacle, for instance in a converter, a ladle, a tundish, or an ingot mould. The specification which follows is based on the application of the invention to taking samples of molten steel, but this is only by way of example anad is not intended to be restrictive.

A metallurgical process such as pig iron refining cannot be correctly controlled unless it is possible to know at any given moment and as accurately as possible the composition of the metal which is being worked. In order to draw the maximum advantage from the information given by knowledge of the composition of the metal at a particular moment (for instance when the converter has just been turned down), it is necessary for the sample, the method of sampling, and the method of analysis to satisfy certain quality criteria.

Concerning the sample, a numbr of criteria are in use for judging its value; for instance: the degree to which it represents the composition of the bath, its homogeneity, its density, the time required for preparing it for analysis, and the ease with which this preparation is effected. The technique used for carrying out the taking of the sample must also be taken into account, in particular as concerns simplicity, duration, and cost.

Numerous studies have already been carried out in order to obtain the best observance of these conditions. It would however appear that in the actual taking of the samples, the present methods of sampling can lead to errors of such a nature that they give a completely false picture of the accuracy of the methods of analysis; for instance, if the sample does not accurately represent the bath.

It is accordingly easy to understand that, whatever may be the technique adopted, the quality of the samples taken depends to a great extent on human factors, since small differences in the way of taking the sample can lead to considerable variations in its representivity or homogeneity. The very adverse conditions under which the samples are taken (thermal radiation, fumes, danger, physical strength required) are such that different people taking samples will differ in the degree to which they obey the necessarily detailed instructions concerning, for instance, the duration of immersion and above all the depth of immersion of the sampling device, and the spot at which it is immersed.

To overcome these disadvantages, suitable devices have already been conceived to mechanize certain phases of the process of taking samples, for instance, the immersion of the probe in the bath of metal. Though these devices certainly offer the advantage that it is possible to reduce the physical effort required of the sampler, they still do not allow him any control as concerns the depth of immersion or the duration of immersion at the pre-arranged depth, which is left to him to work out for himself. Even with the improved devices the human factor is still an important consideration as regards the representivity of the sample and does not allow consistency in conditions of sampling to be ensured.

The present invention provides a device for carrying out a measuring, sampling, or treating operation upon a bath of molten metal in a receptacle, the device comprising:

a. a probe for performing a measuring, sampling, or treating operation;
b. a carrier on which the prove is mounted;
c. a support structure on which the probe-carrier is movably mounted, movement of the probe-carrier allowing the insertion of the probe into the receptacle and its withdrawal from the receptacle;
d. automatic means for inserting the probe into the receptacle by motion of the probe-carrier;
e. automatic means for arresting the motion of the probe-carrier, during insertion, when the probe is at a predetermined position relative to the surface of the bath in the receptacle;
f. automatic means for withdrawing the probe from the receptacle by motion of the probe-carrier when a predetermined length of time has elapsed since the arresting of the motion of the probe-carrier during insertion.

This device makes it possible to eliminate the influence of the human element in each of the phase of operation of a sampling operation.

There are many ways of effecting the immersion of a sampling probe in the bath but in practice this operation can take place easily in two stages, i.e.:

a. Displacement of the support structure of the probe-carrier, e.g. a rod, so as to bring the end of the probe above the point selected in the molten bath for carrying out sampling.
b. The rocking of the rod on the support structure to produce the immersion of the probe. Under there conditions, provided the probe is mounted at a suitably selected angle on the probe-carrying rod, the probe traverses a minimum thickness of slag (trajectory of the probe approximately normal to the surface of the bath).

Leaving aside the displacement movement of hte support structure, e.g. a wagon, the rocking movement or any other movement having the same effect can be carried out easily by means of a double acting piston and cylinder arrangement mounted on the support structure and linked to the probe-carrier so that motion of the piston relative to the cylinder causes motion of the probe-carrier; means for supplying fluid under pressure to one side of the piston; means for supplying fluid under pressure to the other side of the piston; means for draining fluid from the said one side; means for draining fluid from the said other side; and means for controlling the rate at which fluid is supplied to and drained from the cylinder.

In one preferred embodiment of the device of the invention, the means for arresting the probe-carrier comprises a tube, one end of which is free and the other end is connected to a supply device for fluid under pressure; means for introducing the free end of the said tube into the slag or the underlying metal almost at the same time as the introduction of the probe or a little later; and means for arresting the movement of immersion of the probe in dependence on the modification of pressure, appearing in the supply channel for the fluid furnished by the supply device as a result of the immersion of the said tube.

In another preferred embodiment of the device of the invention, the means for arresting the probe at a prearranged depth in the molten bath consists of a duct, one end of which is provided with an escape tube intended to be introduced into the slag or the underlying metal on the immersion of the probe, and the other end of which is connected to a pneumatic push-button, the said duct not having any supply member of any type for fluid under pressure. For example, the end of the duct which enters the bath can comprise material, such as cardboard, which evolves gas when it comes into contact with the slag or molten metal or another constituent of the bath.

Preferably, the automatic withdrawing means is operatively connected with the automatic arresting means via a delay means (e.g. electrical or pneumatic delay means) arranged to introduce a predetermined delay between the arresting of the probe and the withdrawal of the probe.

It is convenient for the withdrawing means to move the probe to a position which is the same as its initial position before the operation of the inserting means.

The automization apparatus, as well as the apparatus for controlling the various members constituting the device of the invention can be wholly or partly electric, mechanical, electromagnetic, electronic, hydraulic, either separately or in combined form. Nevertheless it has been found to be advantageous to ensure the functioning of the major part of the apparatus pneumatically; this has, in particular, the advantage of permitting great aitonomy of utilization of the apparatus, since one can easily provide it with a tank of compressed air, whose capacity allows a great number of operations without it having to be recharged.

The invention will be described further, by way of example only, with reference to the accompanying drawings, in which.

Figure 1:
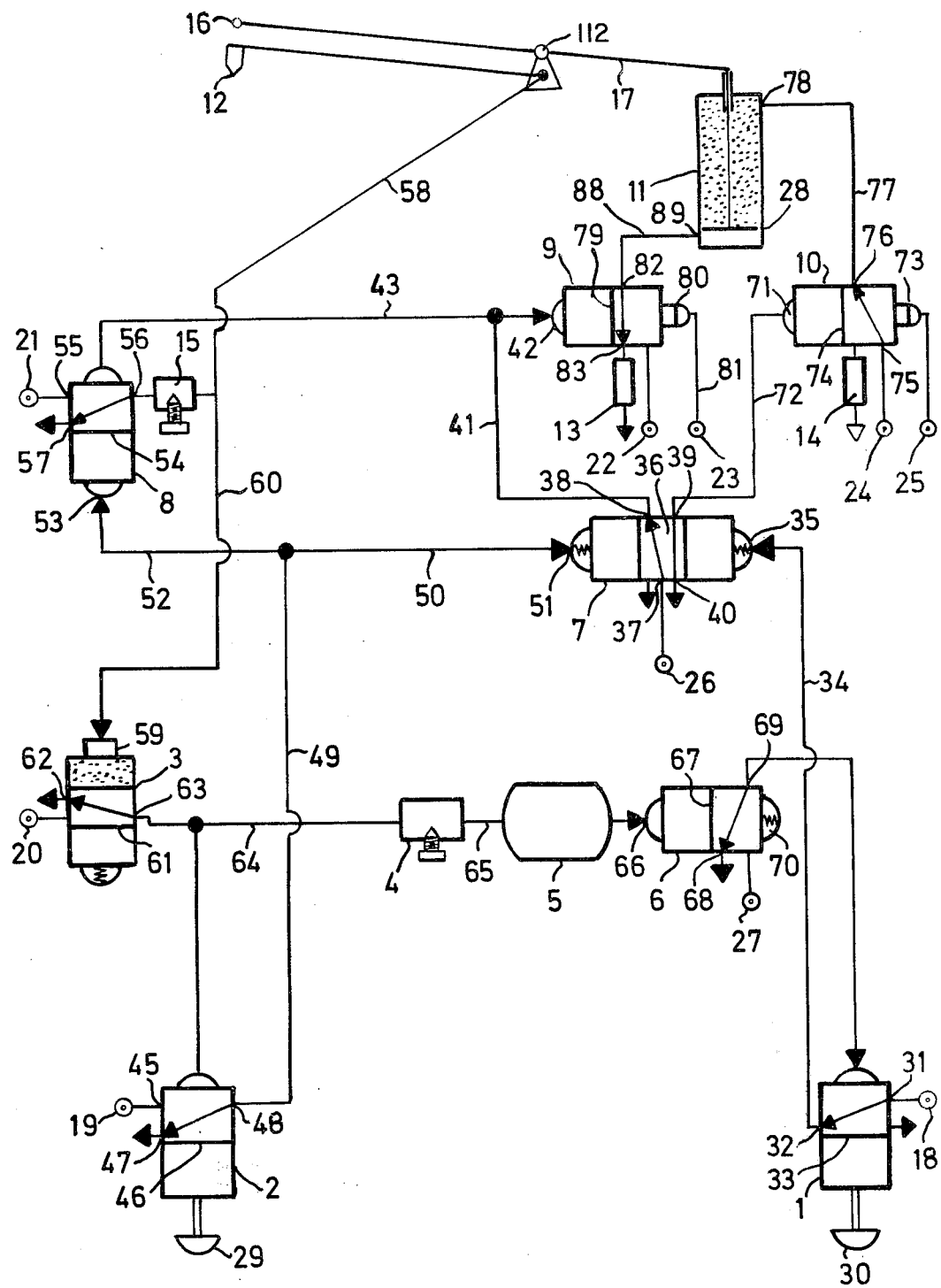
FIGS. 1 to 4 are schematic drawings of one embodiment of measuring and or sampling device according to the invention.
Figure 2:
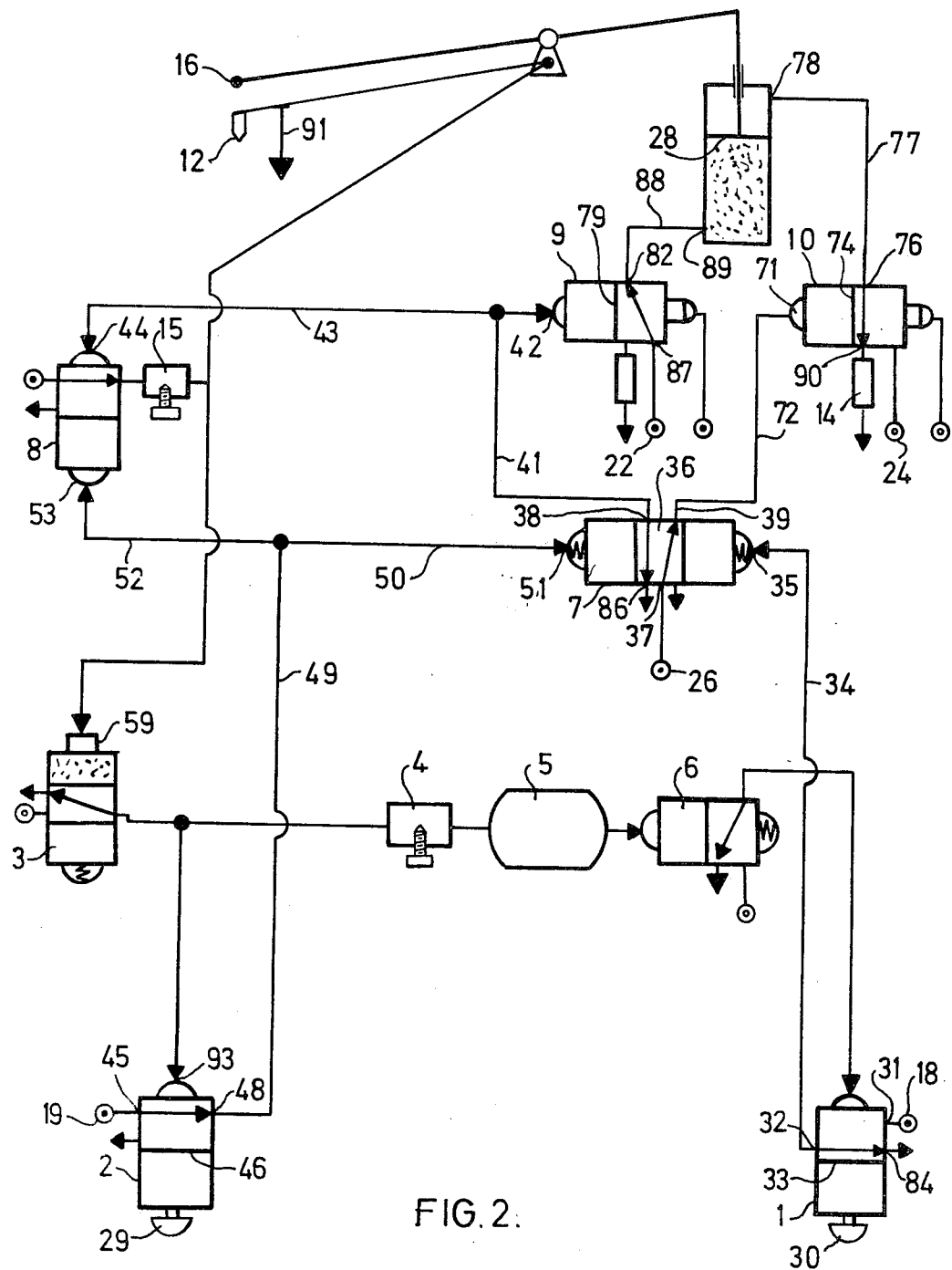
Figure 3:
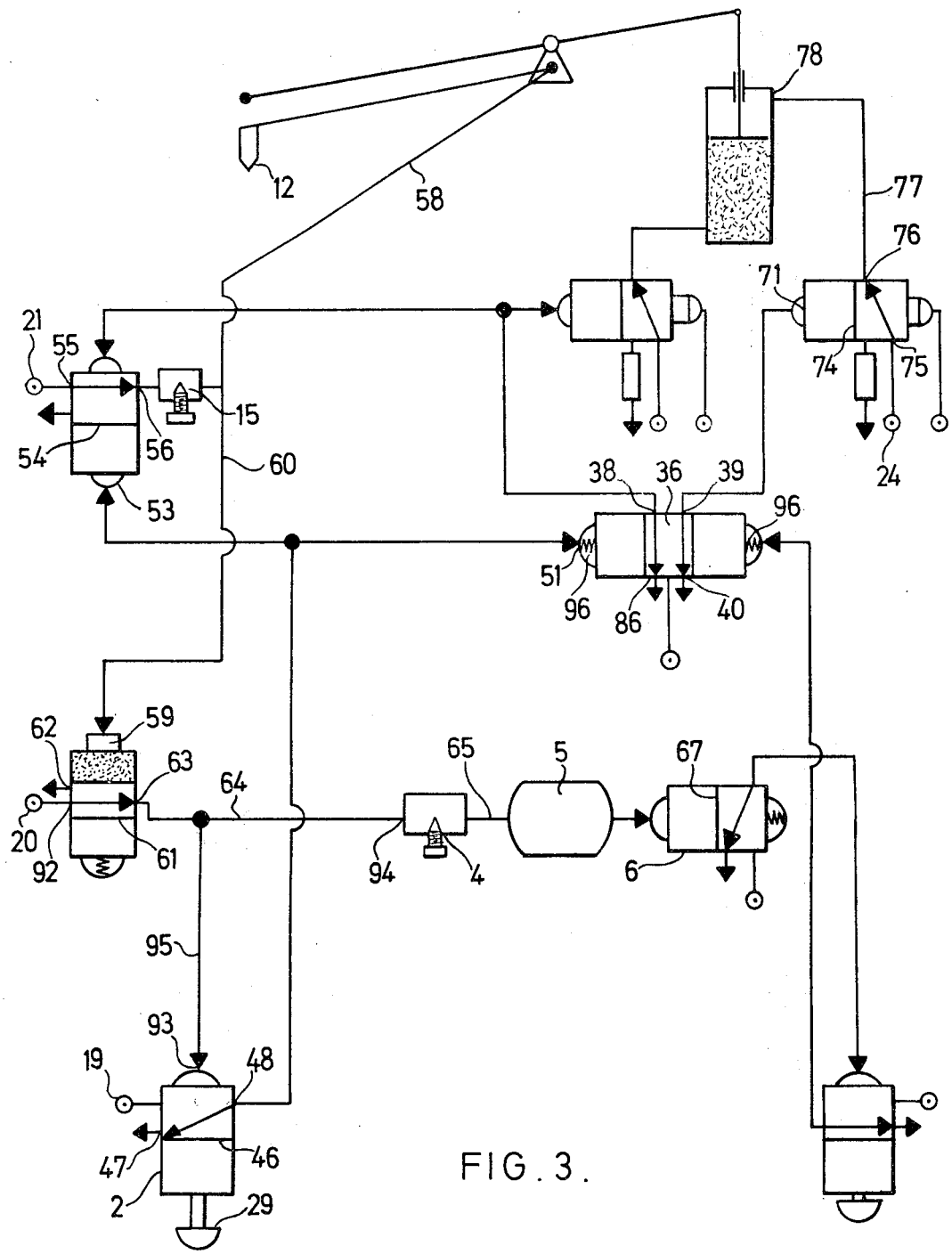
Figure 4:
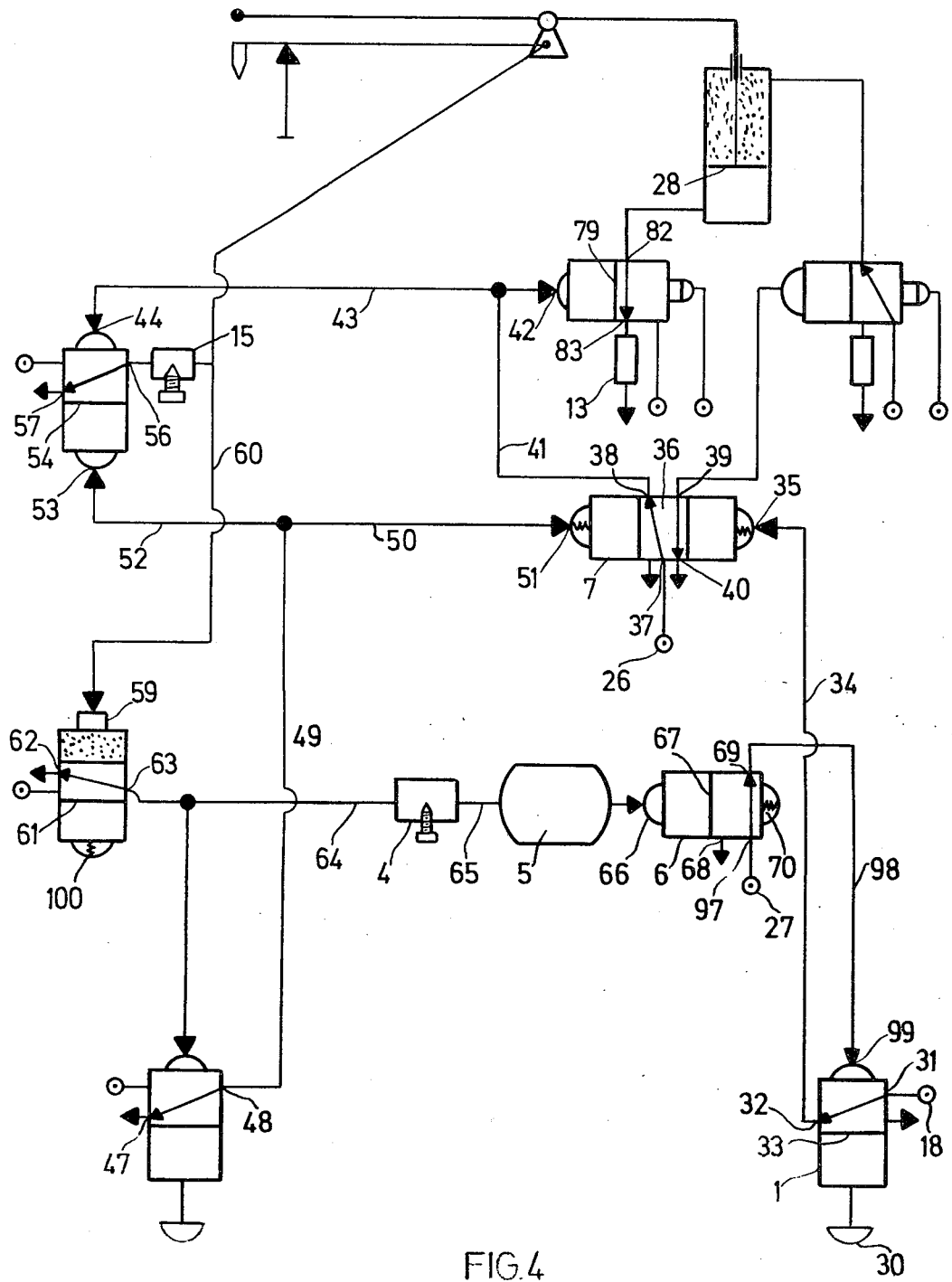

One form of measuring and/or sampling device is shown in FIGS. 1 to 4, which are not drawn to scale, these Figures showing successively the various phase of the complete operating sequence, i.e.:

FIG. 1, initial rest position of the entire device before beginning the operations of taking a measurement or sample;

FIG. 2 control of the immersion of the probe;

FIG. 3 automatic arresting of the immersion;

FIG. 4 delayed return to the initial position.

In all the Figures the same reference numbers represent the same parts. The illustrated device is mounted on a wheeled carriage (not shown).

This device has the following parts:
1. A first unit controlling the starting.
2. A second unit controlling the starting.
3. A pressure amplifier.
4. A speed regulator (needle valve).
5. A reservoir resisting pressure.
6. A distributor associated with the reservoir.
7. to 10. Four slide-valve distributors.
11. A pneumatic cylinder for controlling the movements of a probe carrier 17.
12. An escape tube the movement of which is associated with that of the probe-carrier 17.
13. and 14. Two escape regulators.
15. A neelde valve.
16. A probe at the end of the probe-carrier 17.

Pneumatic lines interconnecting the parts 1 to 17, as shown, the purpose of which is explained below.

18. to 27. A series of 10 sources of supply of compressed air, the common tank supplying all these sources not being shown.

A. The device being in the initial rest position, the carriage is positioned so that the probe 16 is located approximately above the spot where sampling is to take place; the probe-carrying rod 17 is in the lifted position (FIG. 1), its end remote from the probe being articulated to a piston 28 which is in its lowermost position in the cylinder 11, whose axis is substantially vertical; two manual push-buttons 29 and 30 for actuation of the starting units 2 and 1 are in the disengaged position (towards the bottom). The state of the various pneumatic circuits is accordingly as follows.

I. From the source 18 compressed air passes successively through an inlet 31 and an outlet 32 of the unit 1 (which comprises a cylinder containing a piston 33 which, in its lowermost position, allow communication from the inlet 31 to the outlet 32) and from there through a line 34 to a pneumatic push-button 35 of the distributor 7.

II. From the source 19, compressed air is arrested at an inlet 45 of the control unit 2, which comprises a cylinder containing a slide valve 46, which at this moment is in its lowermost position. Two orifices 47 and 48 in the cylinder are in communication with each other, the orifice 47 opening into the free air. By virtue of connecting lines 49, 50, and 52, a pneumatic push-button 51 of the distributor 7 and a pneumatic push-button 53 of the distributor 8, are in the direct communication with the free air (atmospheric pressure). The force exerted by the push-button 35 has thus positioned a slide valve 36 of the distributor 7 in such a manner as to put into communication on the one hand an orifice 37 (connected to the pressure source 26) with an orifice 38, and on the other hand an orifice 39 with an orifice 40 connected to the free air. In this way compressed air supplied from the source 26 passes through the orifice 37, then the orifice 38 and then through a pneumatic line 41, arrives at a pneumatic push-button 42 of the distributor 9, and finally through a connecting line 43, reaches a pneumatic push-button 44 of the distributor 8.

III. Under these conditions, a slide valve 54 of the distributor 8 is in a position (lowermost) such that compressed air coming from the source 21 is arrested at an orifice 55 of the distributor 8, whereas two orifices 56 and 57 of this same distributor are put in communication with each other, the orifice 57 being connected to the free air.

The escape tube 12, connected to the needle valve 15 by a connecting 58, is accordingly also connected line to the free air, in the same way as a pneumatic push-button 59 of the amplifier 3, this latter connection being by virtue of a connecting line 60.

IV. The amplifier 3 comprises a cylinder containing a slide valve 61 which in its present position puts in communication two orifices 63 (connected to the free air) and 63. It follows that the reservoir 5 is also at atmospheric pressure because of a connecting line 64, the valve 4, and a connecting line 65, in the same way as a pneumatic push-button 66 of the distributor 6, whose slide valve 67 is at this moment in a position such that two orifices 68 (connected to the free air) and 69 are in communication. The distributor 6 is provided at one end with a spring 70 which in the absence of pressure at the push-button 66, keeps the slide valve 67 in its position shown in FIG. 1.

V. In the distributor 10 its pneumatic push-button 71 is connected to the free air by virtue of a connecting line 72, connected to the orifice 39 and from there to the orifice 40. Moreover, a pneumatic push-button 73 is under the influence of the pressure of air supplied by the source 25. Under these conditions the slide valve 74 of the distributor 10 is positioned in such a manner that it allows communication of two orifices 75 (under the pressure of air supply at 24) and 76, and to a connecting line 77 to an upper orifice 78 of the cylinder 11, resulting in the appearance of pneumatic pressure on the upper face of the piston 28, which accordingly remains in its lowermost position in the cylinder.

VI. In the distributor 9 the same air pressure rules on the two sides of its slide valve 79, on the one hand through the push-button 42, connected to the source 26 through the line 41 and the orifices 38 and 37, and on the other hand, through a push-button 80 connected to the pressure source 23 by a connecting line 81. In this distributor the area of the face of the slide valve 79 facing the push-button 42 is larger than that of the face on the opposite side. It follows that, in the case of equality of pressure on the two faces of the slide valve, which is the present case, the slide valve places itself in an extreme right-hand position. In this position two orifices 82 and 83 are put into communication with each other, the orifice 83 being directly connected to the escape regulator 13.

B. Control of immersion (FIG. 2).

The operator simultaneously presses the two push-buttons 29 and 30 of the units 2 and 1. When he does so the compressed air from the source 18 is arrested at 31 because of the new position (high position) of the slide valve 33. The orifice 32 is put in communication with the free air through an outlet 84. It follows that the push-button 35 of the distributor 7 is also connected to free air because of the connecting line 34 connected to the orifice 32.

On the other hand, in the operation of the manual push-button 29 displacing the slide valve 46 upwards towards a pneumatic push button 93, the pressure source 19 is put in communication, on the one hand, with the pneumatic push-button 51 of the distributor 7 (through the orifices 45 and 48 and the connecting line 49 and 50) and, on the other hand, with the pneumatic push-button 53 of the distributor 8, through the orifices 45 and 48 and the connecting line 49 and 52. It follows that the slide valve 36 changes position (displacement towards the right) which modifies the pre-existing communications, connecting the orifice 37 to the orifice 39, and connecting the orifice 38 with an orifice 86 (connected to the free air). By this fact, the push-button 42 of the distributor 9 and the push-button 44 of the distributor 8 are connected to the free air by virtue of the connecting lines 41 and 43. On the other hand, the source 26 supplies the push-button 71 of the distributor 10 through the orifices 37 and 39 and the connecting line 72.

In the distributor 9 the connecting of the push-button 42 to the atmosphere makes possible the displacement of the slide valve 79 towards the left, which brings about the communication of the air supply 22 with the lower face of the piston 28 of cylinder 11 (passing through orifices 87 and 82 of the distributor 9, a connecting line 88, and a lower orifice 89 of the cylinder 11). On the other hand, under the influence of the pressure ruling at the push-button 71, the asymmetric slide valve 74 of the distributor 10 moves toward the right, which has the effect of putting the upper orifice 78 of the cylinder 11 in communication with the escape regulator 14 through the connecting line 77, and orifices 76 and 90, the supply being cut out of circuit.

The escape regulator 14 enables the speed of escape of the air to be regulated, and as a result, that of the rise of the piston 28 and consequently the speed of immersion of the probe 16. The probe 16 and the tube 12 commence a descending movement in the direction of the arrow 91.

C. Automatic arresting of immersion (FIG. 3).

It has been pointed out above (B) that as a result of the operating of the manual push-button 29 the pneumatic push-button 53 of the distributor 8 is subjected to air pressure from the source 19. This pressure develops on the lower face of the slide valve 54 a force which displaces the slide valve upwards, putting the source 21 in communication with the lines 58 and 69 by means of the orifices 55 and 56 and the needle valve 15. While the escape tube 12 remains unblocked, that is to say so long as the end of the tube is not in contact with the molten bath, the pressure supplied by the source 21 is insufficient to depress the slide valve 61 of the amplifier 3, and thus the reservoir 5 remains connected to free air through the connecting line 65, the regulator 4, the connecting line 64, and the orifices 63 and 62.

At the moment when in its descending movement the tube 12 penetrates into the layer of slag, the pressure exerted on the push-button 59 by the compressed air from the source 21 becomes sufficient to start the movement of the slide valve 61, which by moving downwardly puts orifices 63 and 92 to the amplifier 3 in communication. Since the orifice 92 is supplied with compressed air directly from the source 20, it follows that pneumatic pressure appears at the push-button 93 of the unit 2 and at an entry 94 of the regulator 4 respectively through connecting lines 95 and 64. The pressure set up at the push-button 93 thrusts the slide valve 46 downwards, causing the manual push-button 29 to be expelled and re-established communication of the orifices 47 and 48 with the free air. As a result of this, the slide valve 36 of the distributor 7 moves to the left (since the pneumatic push-button 51 on the left is also at atmospheric pressure) under the action of a spring 96 so that the orifices 39 and 40 are again in communication with the free air, the orifices 38 and 96 still remaining in communication with the free air. The pressure at the push-button 71 of the distributor 10 drops to the pressure of the free air and the slide valve 74 moves to the left, putting the orifices 75 and 76 in communication so that the source 24, through the upper orifice 78 of the cylinder 11, can again supply the upper chamber of the cylinder 11 and accordingly exert a force on the upper face of the piston 28, which is immediately arrested, since it is in equilibrium (the two faces of the piston are subjected to the same force).

D. Delayed return (FIG. 4).

Under the effect of the pressure which has built up progressively in the reservoir 5 through the regulator 4, the slide valve 67 of the distributor 6 is subjected by its push-button 66 to a force which displaces it to the right. The lapse of time which passes between the moment when the escape tube 12 is blocked and the moment when the slide valve 67 moves towards the right can be regulated either by means of the speed regulator 4 (from 0 to 20 seconds for instance), or by altering the volume of the reservoir 5.

The displacement of the slide valve 67 causes the communication of the orifice 69 with an inlet orifice 97 connected to the source 27, which allows the slide valve 33 of the unit 1 to be thrust downwards by means of a connecting line 98 and a push-button 99. The return of the slide valve 33 to its initial position causes the manual push-button 30 to be expelled and puts in communication the orifices 31 and 32. The pressure from the source 18 is again communicated to the push-button 35 of the distributor 7 (through the connecting line 34); it should be noted that the push-button 51 of this distributor is already connected to free air (through the lines 50 and 49 and the orifices 48 and 47). The slide valve 36 of the distributor 7 again moves to the left, keeping the orifice 39 in communication with the orifice 40 connected to free air, and putting the orifice 38 in communication with the orifice 37 (under pressure from the source 26). The slide valve 79 of the distributor 9 then moves to the right under the pressure exerted through the push-button 42 connected to the orifice 38 by the connecting line 41. The movement of the slide valve 79 puts the orifices 82 and 83 in communication again with the escape regulator 13. The pressure then drops progressively on the lower face of the piston 28. As during this time the pressure exerted on the upper face of the piston 28 is maintained, the piston falls again, which has the effect of causing the probe 16 to rise.

Figure 5:
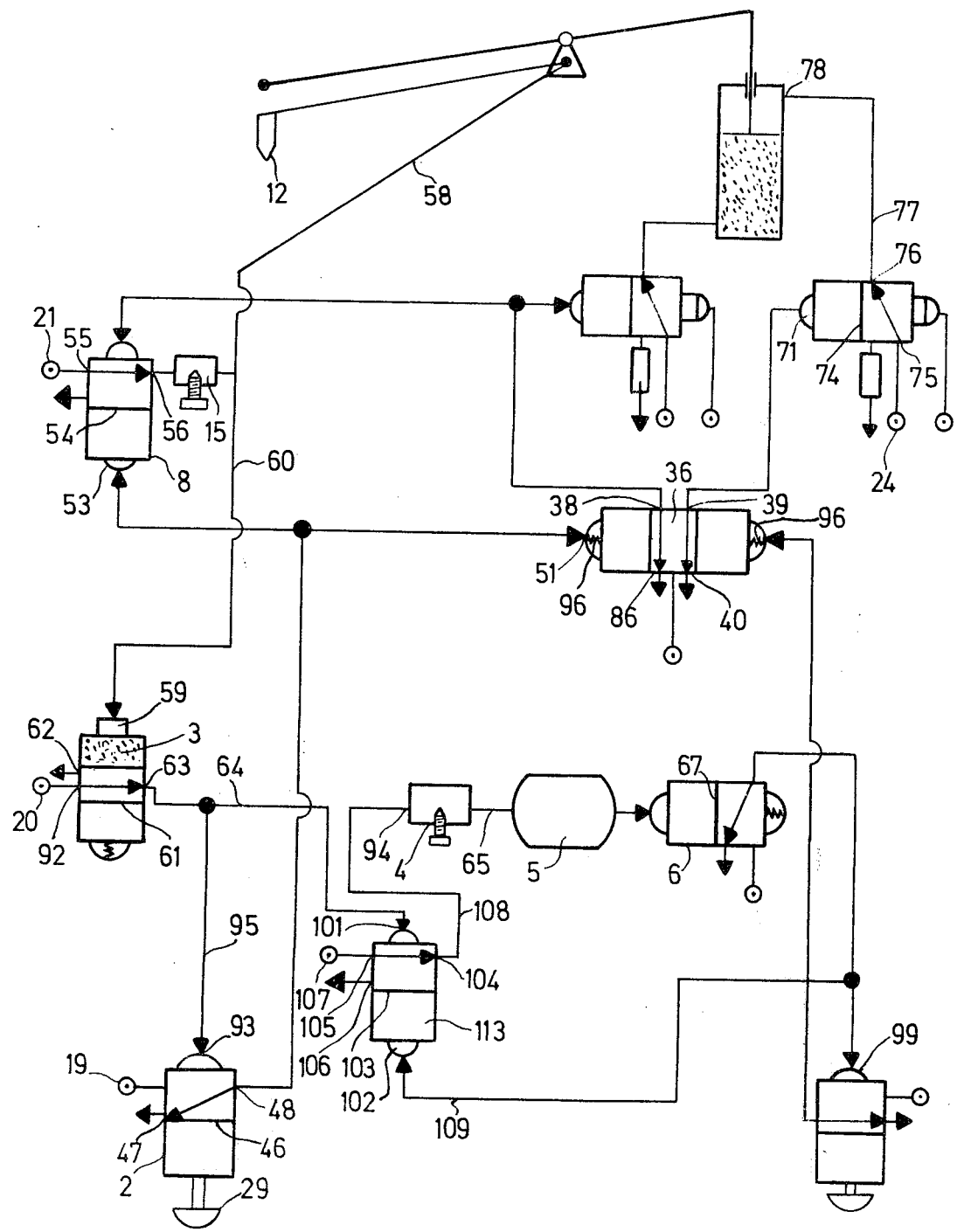
FIG. 5 is a schematic drawing of a modification of the device of FIGS. 1 to 4.
Figure 6:
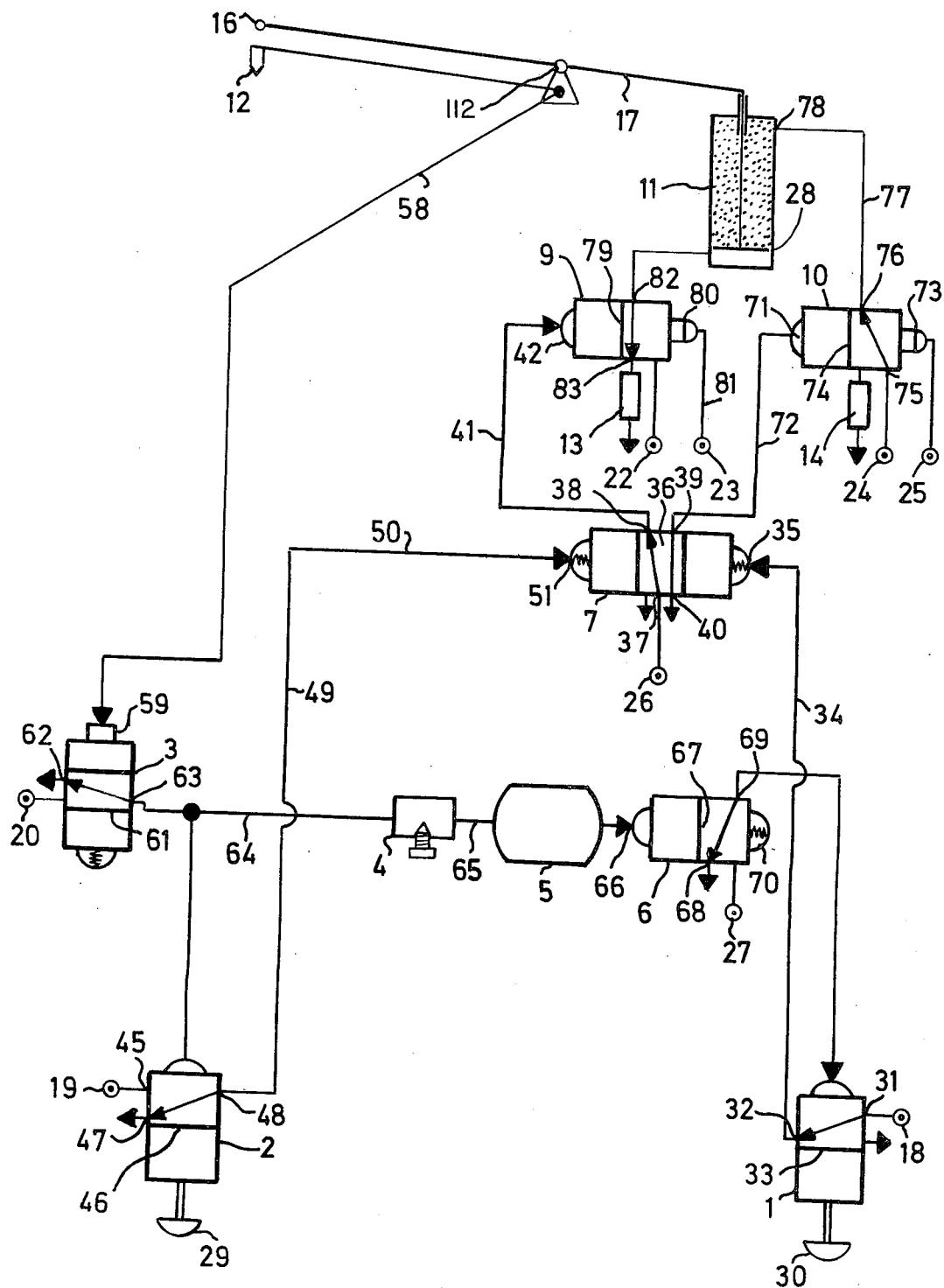
FIGS. 6 to 9 are schematic drawings of another embodiment of the device.

Furthermore, the supply which has re-appeared at the orifice 38 (distributor 7), also exerts itself on the push-button 44 of the distributor 8 (through the lines 41 and 43). The slide valve 54 of the distributor 8 drops down again (observe that at this moment the push-button 53 of the distributor is connected to free air through the lines 52 and 49 and the orifices 48 and 47) which puts the orifices 56 and 57 in communication again, the orifice 57 being connected to free air. It follows that the pressure exerted on the push-button 59 (amplifier 3) through the valve 15 and the connecting line 60 drops to atmospheric pressure and the slide valve 61 rises the under the force of a spring 100, so that the entire circuit comprising the push-button 66, the reservoir 5, the connecting line 65, the regulator 4, the connecting line 64, and the orifices 63 and 62, is put in communication with the free air. Finally, the spring 70 (distributor 6) thrusts the slide valve 67 to the left, which puts the orifice 69 in communication again with the orifice 68 (connected to free air). The entire device is thus brought back to its inital (rest) position and is ready to be used again. In the device described above the delay control circuit can be modified in the following manner (see FIG. 5, which is similar to FIG. 3). The connecting line 64, instead of directly connecting the orifice 63 with the entry 94 of the needle valve 4 leads to a distributor 113 similar to the distributor 8. This distributor 113 has two pneumatic push-buttons 101 and 102, a two-position slide valve 103 and three orifices 104, 105 and 106 and is connected to a source 107 and two connecting lines 108 and 109. This modified device operates as follows.

When under the effect of the pressure ruling at the push-button 59 the slide valve 61 is moved so that the source 20 is in communication with the orifice 63, the pressure from the source 20 is transmitted to the push-button 101, which acts on the slide valve 103 and gives it a position such that the source 107 communicates with the orifice 104 through the orifice 105. From the orifice 104 the pressure from the source 107 propagates through the connecting line 108 to the needle valve 4, the reservoir 5, and the distributor 6, as if the pressure were coming from the source 20.

The operation of raising the probe is controlled in the first place by the displacement of the slide valve 67 of the distributor 6 as has been explained above. This displacement (FIG. 4), which set up against the pressure of the source 27 at the push-button 99, also sets the pressure up again at the push-button 102 because of the connecting line 109; a distributor 113 is thus brought back to its initial state in which the reservoir 5 can discharge to free air by virtue of the connecting line 108 and the orifices 104 and 106 (the latter connected to free air) put in communication by the rising movement of the slide valve 103 under the action of the thrust due to the push-button 102.

This modification has the advantage of sheltering the circuit 4, 5 and 6 from any accidental pressure variation occurring in the amplifier, 3, since the amplifier 3 is superseded by the distributor 113 as soon as a single pressure pulse has been transmitted from the source 20 to the push button 101.

From the above description it can be understood that the only movement carried out by the operator, after having brought the probe (by means of the carriage) into position above the spot where the sampling to to take place, consists in pressing simultaneously the two manual push-buttons 29 and 30; the entire sequence being then carried out automatically and in the order indicated. Moreover, the actual positioning of the probe does not present any difficulty since the probe carrier is mounted on a carriage whose operation need not depend on the strength, the resistance to thermal radiation, or the boldness of the operator. It should also be pointed out that, because of the probe-carrying rod is mounted on the carriage, it can be of a length greater than that which is possible with normal sampling. As tests carried out in steelworks have shown, it is for instance possible to carry out sampling at the end of the first LD-AC refining phase from beyond the blocks of not yet melted scrap, which if one is operating by manual strength is quite uncertain and regularly lead to injurious time loss.

There is some point in mentioning here that the probe 16 and the escape tube 12 are drawn in a purely diagrammatic manner. In fact, the probe is an elongate tube fixed to the end of the rod 17 in such a manner that when the rod is tilted down (FIG. 2) the probe enters the bath substantially vertically. The probe has at its end all the apparatus necessary for the measurements to be carried out and/or the samples to the taken; its length is such that its lower end is in the molten metal when the free end of the escape tube 12 enters the slag.

A second form of the device is shown in FIGS. 6 to 9, not drawn to scale, these Figures showing successively the various phases of the complete operating sequence, these being the same as in FIGS. 1 to 4.

In FIGS. 6 to 10 the same references represent the same parts as were described with reference to FIGS. 1 to 5. Once again, the device is mounted on a wheeled carriage (not shown).

A. The device being in the initial rest position (FIG. 6), the carriage is brought to a spot such that the probe 16 is located approximately above the place where sampling or measurement is to take place; the probe-carrying rod 17 is in the raised position (FIG. 6) and in the cylinder 11, whose axis is substantially vertical, the piston 28 is located in its lowermost position; the two manual push-buttons 29 and 30 of the units 2 and 1 are in the disengaged position (towards the bottom). The state of the various pneumatic circuits is then as follows:

I. From the source 18, compressed air passes successively through an inlet 31 and an outlet 32 of the unit 1 and from there via the line 34 to the pneumatic push-button 35 of the distributor 7.

II. From the source 19, compressed air is arrested at the entry orifice 45 of the control unit 2, whose slide valve 46 is at this moment in its lowermost position. The two orifices 47 and 48 are in communication with each other, the orifice 47 being connected to the free air. It follows that, by virtue of the connnecting lines 49 and 50, the pneumatic push-button 51 of the distributor 7 is in direct communication with the free air (atmospheric pressure). The force exerted by the push-button 35 displaces the slide valve 36 so as to put in communication, on the one hand, the orifice 37 (connected to the source 26) with the orifice 38, and, on the other hand, the orifice 39 with the orifice 40 connected to the free air. In this manner the compressed air supplied by the source 26 passes through the orifices 37 and 38, then through the connecting line 41, and reaches the push-button 42 of the distributor 9.

III. Under these conditions the escape tube 12 is connected to free air as is also the push-button 59 of the amplifier 3 by virtue of the connecting line 58.

IV. The slide valve 61 of the amplifier 3 in its present position puts in communication the orifices 62 (connected to free air) and 63. It follows that the reservoir 5 is also at atmospheric pressure by virtue of the connecting line 64, the needle valve 4, and the connecting line 65, as is the push-button 66 of the distributor 6 whose slide valve 67 is at this moment in a position such that the orifices 68 (connected to free air) and 69 are in communication. The distributor 6 is provided at onen end with a spring 70 which in the absence of pressure at 66, keeps the slide valve 67 in its position shown in FIG. 6.

V. In the distributor 10 the pneumatic push-button 71 is connected to free air by the connecting line 72, the orifice 39, and the orifice 40. Moreover, the push-button 73 is under the pressure of air delivered by the source 25. Under these conditions the slide valve 74 of the distributor 10 is positioned so that it permits communication of the orifices 75 (under the pressure source 24) and 76, and through the connecting line 77 and the upper orifice 78 of the cylinder 11 permits the appearance of air pressure on the upper face of the piston 28, which accordingly remains in the lowermost position in the cylinder.

VI. In the distributor 9 the same pressure rules on both sides of the slide valve 79, on the one hand through the pneumatic push-button 42 connected to the source 26 through the connecting line 41 and the orifices 38 and 37, and on the other hand through the pneumatic push-button 80 connected to the pressure source 23 through the connecting line 81. In this distributor 9 the area of the face of the slide valve 79 facing the push-button 42 is larger than that of the opposite face. It follows that in the case of equality of pressure on the two faces of the slide valve, which is the present case, the slide valve places itself in an extreme position on the right. In this position the orifices 82 and 83 are put in communication with each other, the latter orifice being directly connected to the escape regulator 13.

Figure 7:
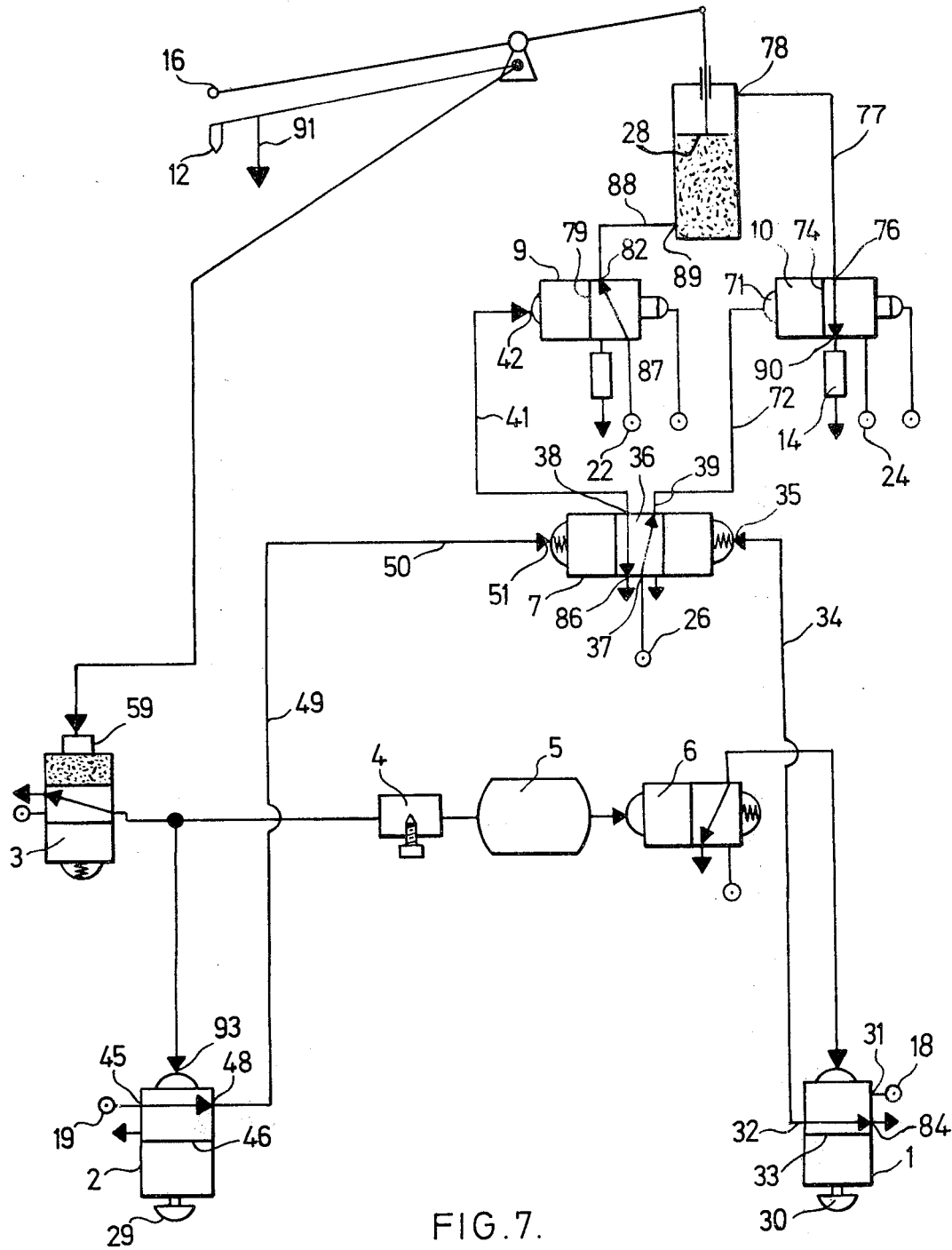

B. Control of immersion (FIG 7).

The operator simultaneously presses the two manual push-buttons 29 and 30 of the units 2 and 1. In doing this the compressed air from the source 18 is arrested at the inlet 31 by virtue of the new (high) position of the slide valve 33. The orifice 32 is put in communication with the free air through the orifice 84. It follows that the push-button 35 of the distributor 7 is also connected to free air by virtue of the connecting line 34 connecting it to the orifice 32.

In constrast to this, on the depression of the manual push-button 29, displacing the slide valve 46 upwards towards the push-button 93, the pressure source 19 is put in communication with the pneumatic push-button 51 of the distributor 7 via the orifices 45 and 48 and the connecting lines 49 and 50. It follows that the slide valve 36 changes position (displacement towards the right), which modifies the pre-existing communication, connecting on the one hand the orifice 37 with the orifice 39 and on the other hand the orifice 38 with the outlet orifice 86 (connected to free air). By this fact the push-button 42 of the distributor 9 is connected to free air by virtue of the connecting line 41. On the other hand, the source 26, via the orifices 37 and 39 and the connecting line 72, supplies the push-button 71 of the distributor 10.

In the distributor 9, the connecting of the push-button 42 to the atmosphere permits the displacement of the slide valve 79 to the left, which brings about the communication of the supply 22 with the lower face of the piston 28 of the cylinder 11, via the orifices 87 and 82 of the distributor 9, the connecting line 88, and the lower orifice 89 of the cylinder 11. In the other hand, under the influence of the pressure ruling at the push-button 71, the asymmetric slide valve 74 of the distributor 10 moves towards the right, which has the effect of putting the upper orifice 78 of the cylinder 11 in communication with the escape regulator 14 through the connecting line 77 and the orifices 76 and 90, the source 24 being moreover disconnected. The escape regulator 14 permits regulation of the escape speed of the air, and consequently that the ascent of the piston 28 and as a result the speed of motion of the probe 16. The probe 16 and the tube 12 commence a descending movement indicated by the arrow 91.

Figure 8:
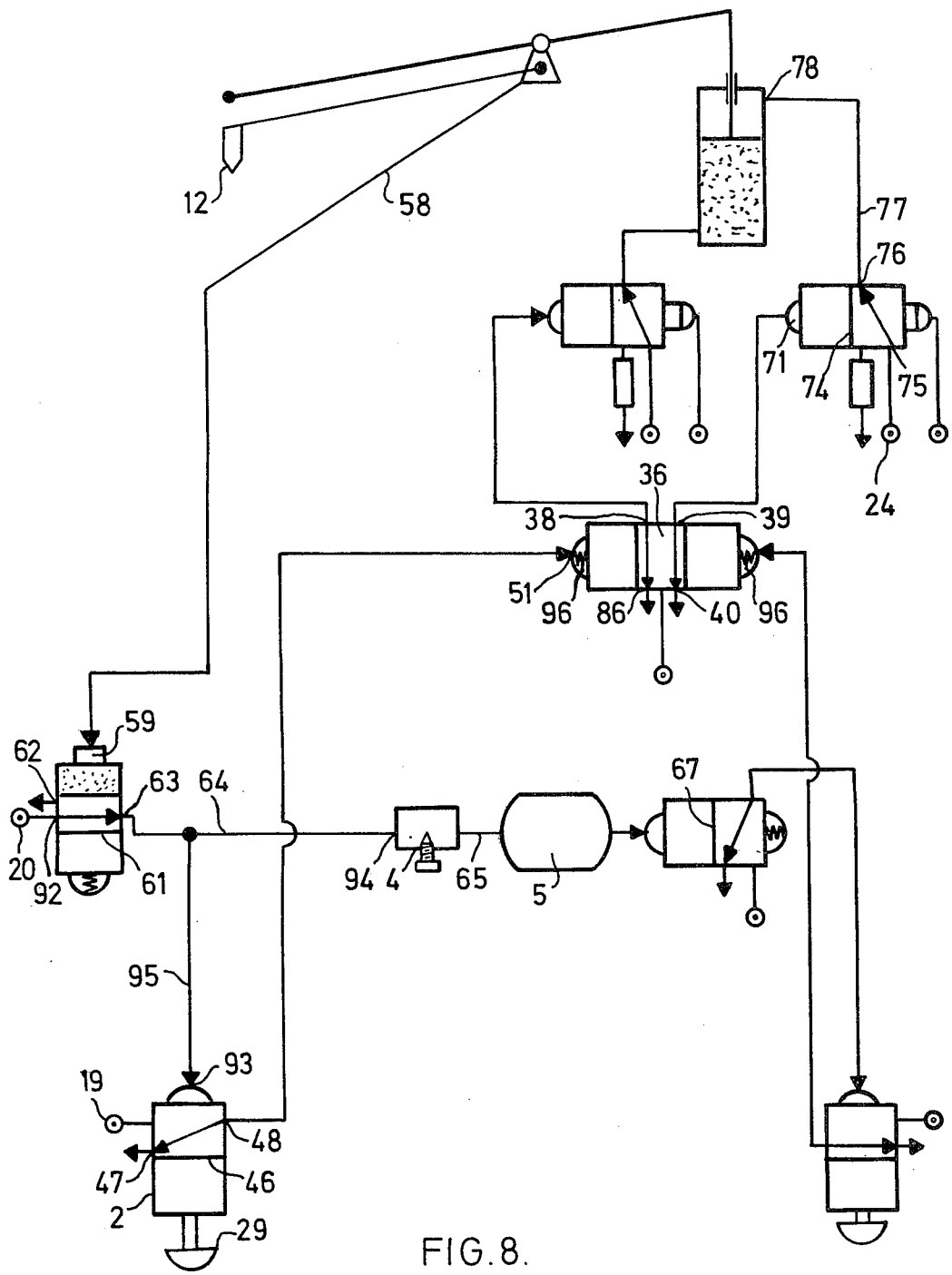

C. Automatic arresting of the immersion (FIG. 8).

While the escape tube 12 remains free, that is to say while the open end of the tube is not in contact with the bath, the pressure existing in the line 58 is insufficient to actuate the slide valve 61 of the amplifier 3 so as to move it downwardly, so the reservoir 5 remains connected to the free air through the connecting line 65, the valve 4, the connecting line 64, and the orifices 63 and 62.

At the moment when in its descent movement the tube 12 penetrates into the layer of slag, pressure is exerted on the push-button 59 either by thermal expansion of air contained in the tube 12 and the connecting line 58, or by the effect of the evolution of gas in the tube 12 and the connecting line 58 by reaction of the tube 12 with the molten slag or metal. This pressure becomes sufficient to move the slide valve 61, which is moving downwards puts the orifices 63 and 92 of the amplifier in communication. As the orifice 92 is supplied directly with compressed air from the source 20, it follows that pressure appears at the push-button 93 of the unit 2 and at the entry 94 of the valve 4 through the connecting lines 95 and 64 respectively. The pressure set up at the push-button 93 thrusts the slide valve 46 downwards, causing the manual push-button 29 to spring out and putting the orifices 47 and 48 in communication with the free air. By this fact, the slide valve 36 of the distributor 7 is moved towards the left (since push-button 51 on the left is also at atmospheric pressure), because of the action of the springs 96, in such a manner that the orifices 39 and 40 are again in communication and connected to free air, the orifices 38 and 96 still remaining in communication with the free air. The pressure at the push-button 71 of the distributor 10 drops to the pressure of the free air and the slide valve 74 moves towards the left, again putting the orifices 75 and 76 in communication, which allows the source 24 through the upper orifice 78 of the cylinder 11 again to supply the upper chamber of the cylinder and accordingly to exert a force on the upper face of the piston 28, which is immediately arrested as it is in equilibrium (the two faces of the piston are subjected to two equal forces and in opposite directions).

Figure 9:
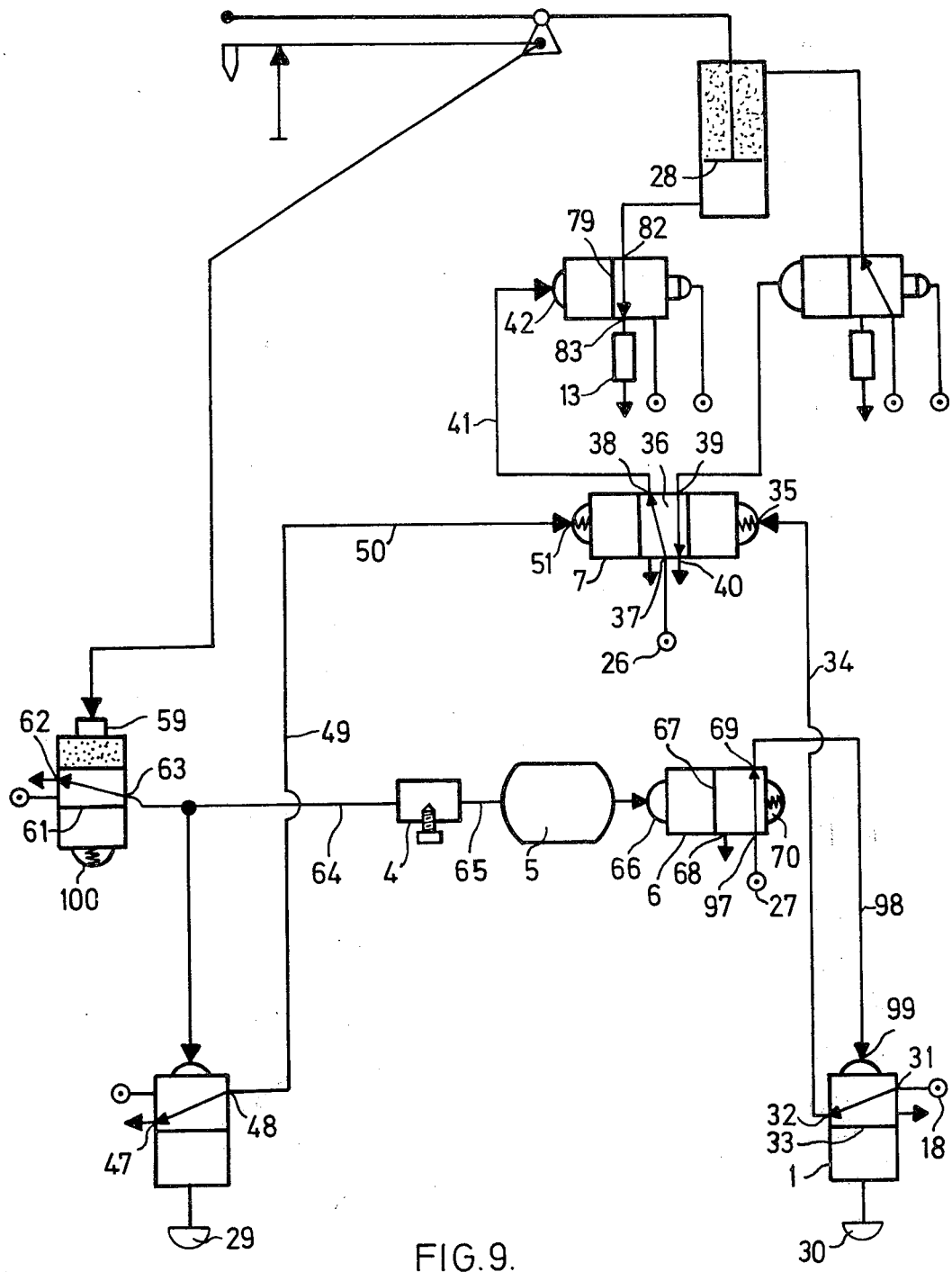

D. Delayed return (FIG. 9).

Under the effect of the pressure which rises progressively in the reservoir 5, via the valve 4, the slide valve 67 of the distributor 6 is subjected by means of its push-button 66 to force which moves it towards the right. The lapse of time which passes between the moment when the escape tube 12 is obturated and the moment when the slide valve 67 moves towards the right can be regulated either by means of the speed regulator 4 (from 0 to 20 seconds for instance) or by altering the volume of the reservoir 5.

The displacement of the slide valve 67 effects communication of the orifice 69 with the inlet orifice 97, which is itself connected to the source 27, thus permitting the slide valve 33 of the unit 1 to be thrust downwards via the connecting line 98 and the push-button 99. The return of the slide valve 33 to its initial position causes the manual push-button 30 to spring out and put the inlet 31 and outlet 32 in communication. The pressure from the source 18 is again communicated to the push-button 35 of the distributor 7 (through the connecting line 34); it should be noted that the push-button 51 of this distributor is already connected to the free air (via the connecting lines 50 and 49 and the orifices 48 and 47). The slide valve 36 of the distributor 7 moves again towards the left, keeping the orifice 39 in communication with the orifice 40 (connected to the free air) and re-establishing communication between the orifice 38 and the orifice 37 (under pressure from the source 26). The slide valve 79 of the distributor 9 then moves toward the right under the pressure exerted on the push-button 42 connected to the orifice 38 by the connecting line 41.

The movement of the slide valve 79 re-establishes communication of the orifices 82 and 83 with the escape regulator 13. The pressure then drops progressively on the lower face of the piston 28. As during this period the pressure exerted on the upper face of the piston 28 is maintained, the piston falls, which has the effect of causing the probe 16 to rise. It follows that the pressure existing at the push-button 59 (amplifier 3), via the connecting line 58, drops to the value of the pressure of the free air and the slide valve 61 rises again under the force of the spring 100, thus connecting to free air the entire circuit comprising the push-button 66, the reservoir 5, the connecting line 65, the valve 4, the connecting line 64, and the orifices 63 and 62. Finally, the spring 70 (distributor 6) thrusts the slide valve 67 to the left, which re-establishes communication between the orifice 69 and the orifice 68 (connected to free air). The entire device is thus brought back to its initial position and can be used again.

Figure 10:
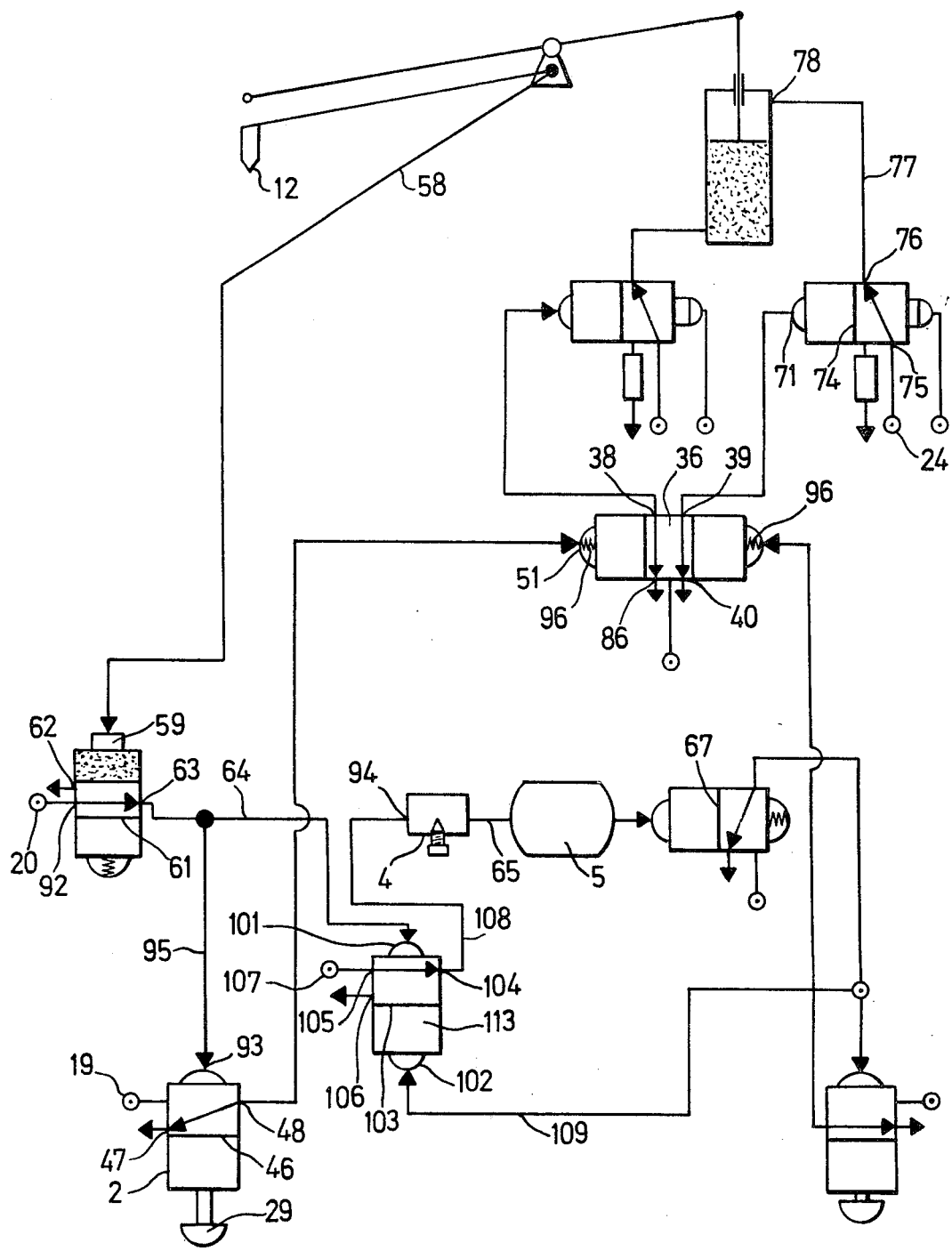
FIG. 10 is a schematic drawing of a modification of the device of FIGS. 6 to 9.
Figure 11:
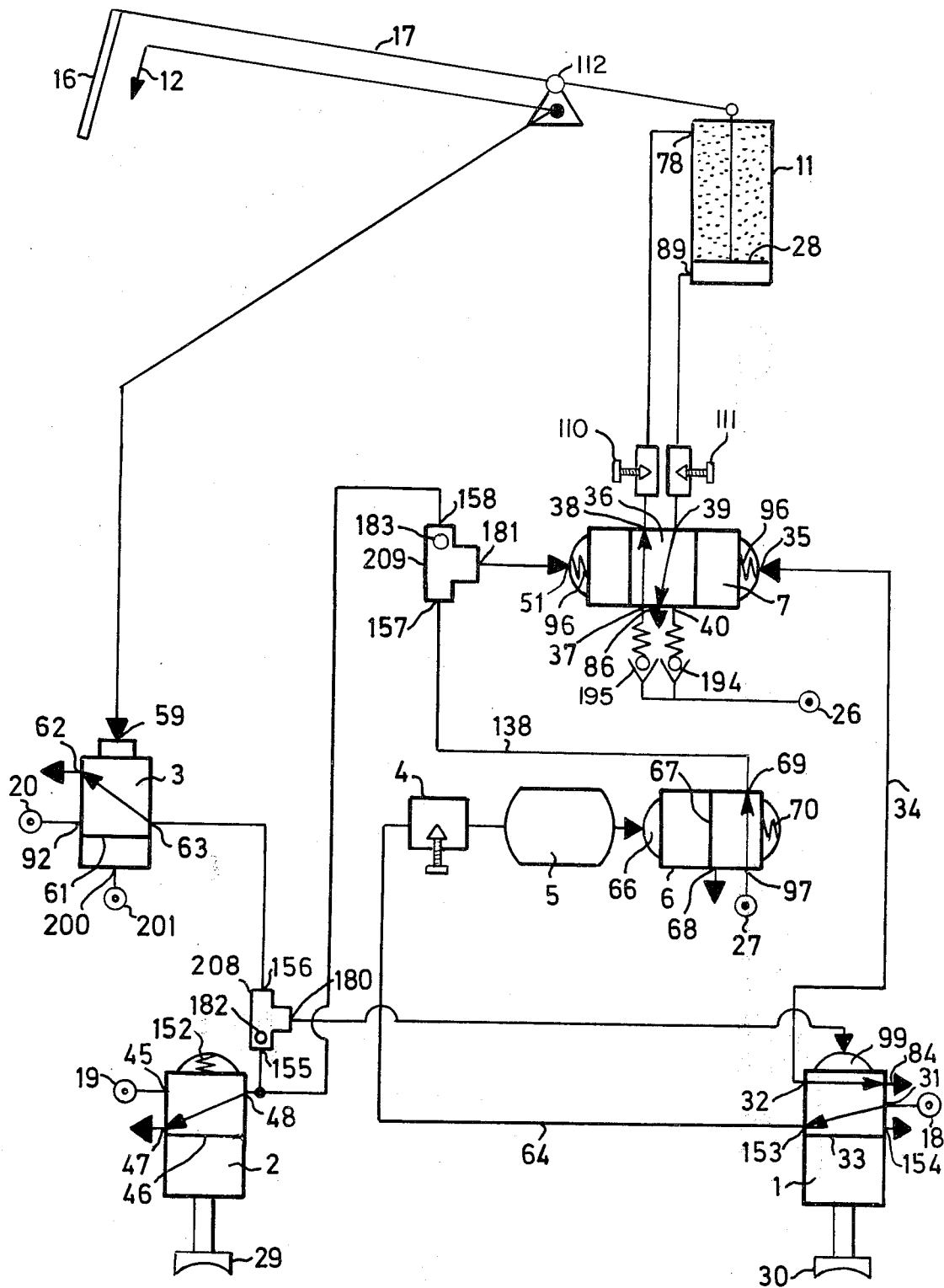
FIGS. 11 to 15 are schematic drawings of yet another embodiment of the device.

In the device described above, the delay control circuit can again be modified in the following manner (see FIG. 10, which is similar to FIG. 8). The connecting line 64, instead of connecting the orifice 63 directly to the entry 94 of the needle valve 4, leads to a distribution 113. This distributor 113 has two pneumatic push-buttons 101 and 102, a two-position slide valve 103, and three orifices 104, 105 and 106, and is connected to a source 107 and two connecting lines 108 and 109. This modification operates in the way already described above with reference to FIG. 5.

A third form of the device is shown in FIGS. 11 to 14, not drawn to scale, these Figures showing successsively the various phases of the complete operation sequence, these being the same as in FIGS. 1 to 4 and in FIGS. 6 to 9.

Figure 15:
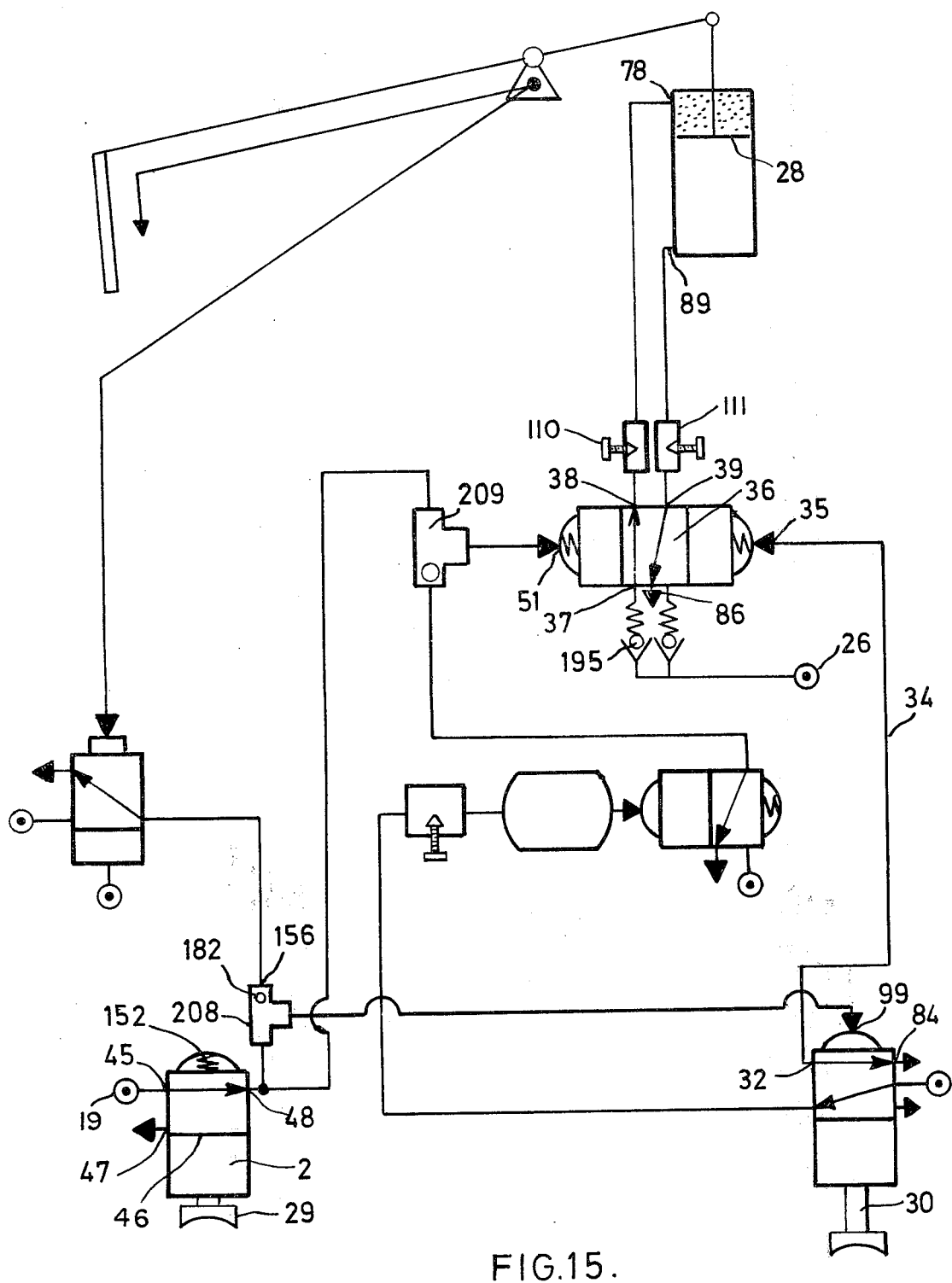

FIG. 15 shows manual intervention for arresting, for part or stepwise raising, and for total raising.

In FIGS. 11 to 15 the same reference numbers represent similar parts in FIGS. 1 to 5 and in FIGS. 6 to 10. The assembled device is mounted on a wheeled carriage (not shown) as before.

A. The device being in the initial rest position, the carriage is brought to a place such that the probe 16 is approximately above the spot where the sample-taking is to be carried out; the probe-carrying rod 17 is in the raised position (FIG. 11) and in the cylinder 11, whose axis is substantially vertical, the piston 28 is in its lowermost position, the two manual push-buttons 29 and 30 of the units 2 and 1 being in the extended position. The situation of the various circuits is accordingly as follows.

I. From the source 18, the compressed air passes successively through an inlet 31 and an outlet 153 of the unit 1 and from there through the connecting line 64 to the needle valve 4, then to the reservoir 5 and the distributor 6.

II. From the source 19 the compressed air is arrested at the entry orifice 45 of the manual control unit 22; the two orifices 47 and 48 are in communication with each other, the orifice 47 being moreover connected to the free air. The air pressure at the outlet orifice 48 is arrested on the one hand by a ball 182 (under its own weight) in a ball valve 208, and on the other hand by a ball 183 in a ball valve 209, held in a high position by pressure supplied from the source 27.

III. Under the effect of the pressure from the reservoir 5, the slide valve 67 of the distributor 6 is in a position such that the compressed air from the source 27 is in communication with the orifice 69 via the orifice 97, then through the a connecting line 138 with the valve 209, whose sphere or ball 183 it thrusts up towards an orifice 158. From the valve 209, through the orifice 181, the pneumatic pressure is transmitted to the push-button 51 of the distributor 7. At this moment the other push-button 35 of the distributor 7 is not subjected to any pressure since it is connected to the free air through the connecting line 34, and the orifices 32 and 84. By this fact the slide valve 36 of the distrubutor 7, which is urged only by the pneumatic push-button 51 and the two springs 96, takes up its extreme right position.

IV. In this position the source of compressed air 26 is in communication with the orifices 78 at the top of the cylinder 11 through a non-return ball valve 195, the orifices 37 and 38 and a needle valve 110. The piston 28 is thus held downwards, since there is not pressure on its lower face, which is in communication with the free air through the orifice 89, a needle valve 111, and the orifices 39 and 86.

V. The amplifier 3 as well as the unit 2 are not in service, the channels issuing fron the orifices 48 and 63 or from the push-button 59 are all connected to the free air.

Figure 12:
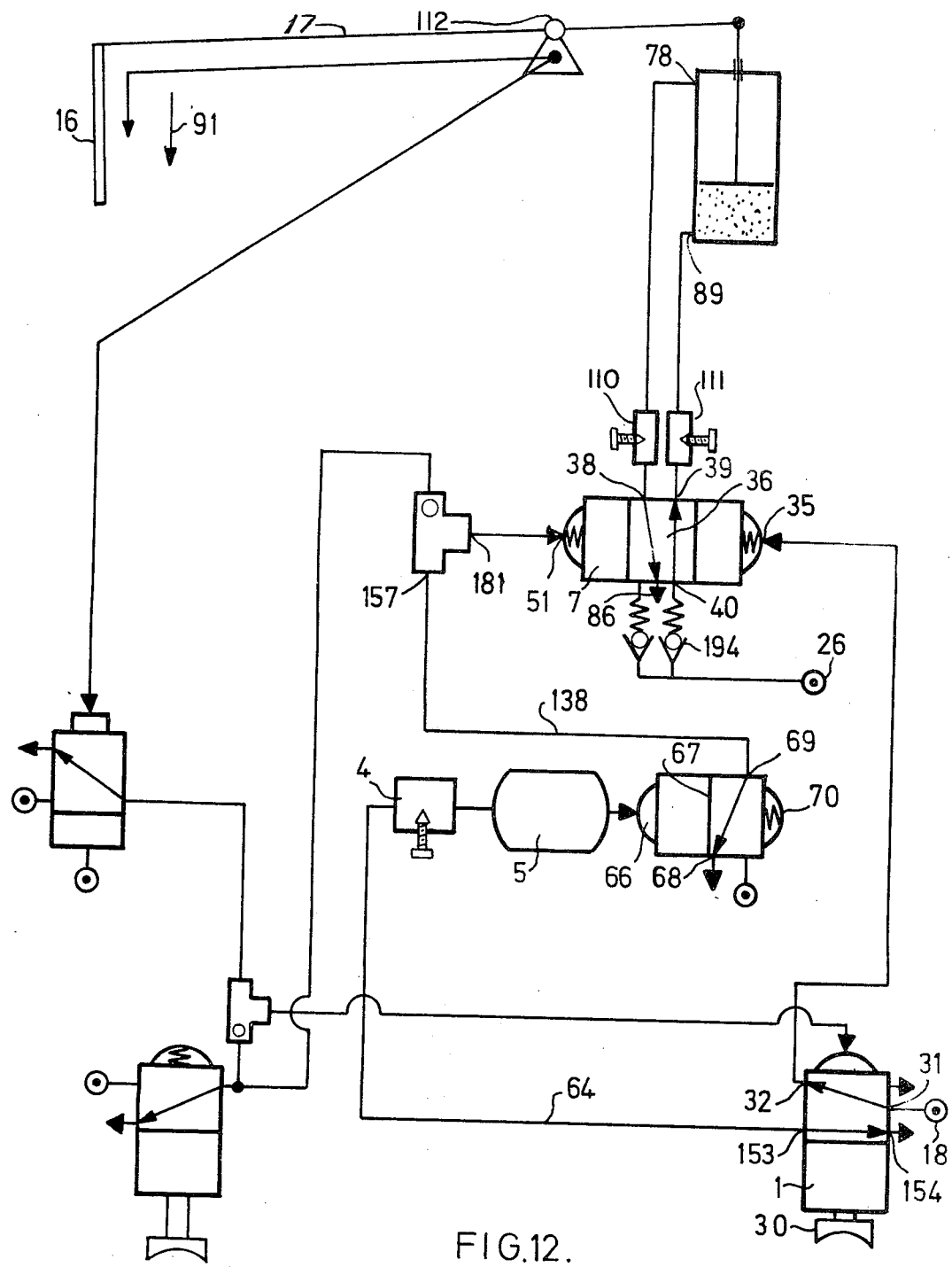

B. Control of immersion (FIG. 12).

The operator presses down the push-button 30 which remains pressed down. When this takes place, the compressed air coming from the source 18 is put in communication with the push-button 35 of the distributor 7 through the orifices 31 and 32 and the conecting line 34. Furthermore, the orifice 153 is held in communication with the free air through an orifice 134, and consequently the reservoir 5 discharges to the free air through the needle valve 4 the connecting line 64, and the orifices 153 and 154 and the slide valve 67 takes up its position on the left under the effect of the spring 70 and the disappearance of pressure at the push-button 66.

In this new position of the slide valve 67 the orifice 69 is connected to the free air through the orifice 68, and consequently the pressure at the push-button 51 disappears, the via the orifice and 181, and 157 and the connecting line 138. In the distributor 7 the slide valve 36 takes up its extreme left position as a result of the thrust which has appeared at the push-button 35 and has disappeared at the push-button 51, and in this position of the slide valve, the source of compressed air 26 supplies the lower face of the piston 28 through a non-return valve 194, then through the orifices 40 and 39, the neddle valve 89, and the orifice whereas the upper face of the piston 28 is in communication with the free air through the orifice 78 the neddle valve 110 and the orifice 38 and 86. The piston 28 then rises in the cylinder 11, the probe-carrier 17 tilts down round a pivot point 112 and the probe descends into the molten bath in the direction of the arrow 91.

Figure 13:
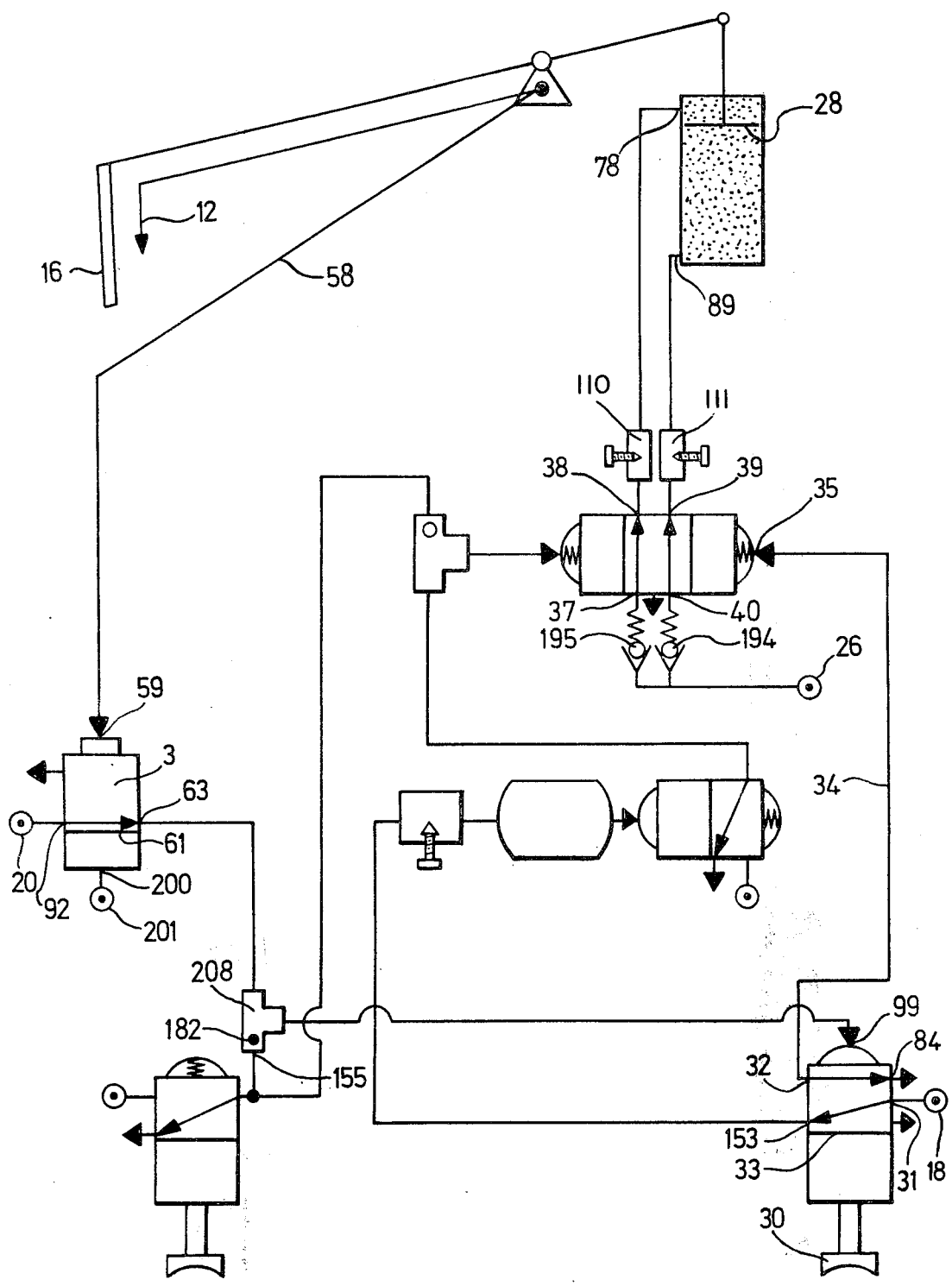

C. Automatic arresting of the immersion (FIG. 13).

The excape tube 12, the movement of which follows that of the probe 16, as a result of this penetrates into the bath of molten metal. Its end becomes a pressure source either because of the ferrostatic pressure to which it is subjected or because its end begins to burn and release gas. The pressure propagates through the connecting line 58 to the push-button 59 of the distributor 3. Theh slide valve 61 takes up its open position which puts the source 20 in communication with the orifice 63 through the orifice 92. The pressure which has appeared at 63 propagates through the valve 208, whose ball or sphere 182 is against an orifice 155, via an orifice 180 to the counter push-button 99 which expels the push-button 30 into the "pulled" position.

The movement of the slide valve 33 re-establishes communication between the orifice 32 and the free air at the orifice 84, and consequently between the push-button 35 and the free air the connecting line through 34. The disappearance of pneumatic pressure at the push-button 35 has as consequence that the slide valve 36 takes up its median position of equlibrium, which on the one hand maintains communication between the source of compressed air 26 and the lower face of the piston 28 via the non-return valve 194, the orifice 40 and the neddle valve 39, 111 and 89 the orifice and on the other hand, re-establishes communication of this same source 26 with the upper face of the piston 28 via the non-return valve 195, 37 the orifice and 38, the neddle valve 110 and the orifice 78. The piston 28 urged in this manner on its two faces by two equal forces and in contrary directions remains immobile in the high position, to which corresponds the low position of the probe. It is obvious that the regulation of the depth of penetration of the probe in the molten bath can take place easily by means of regulating the distance existing between the end of the probe 16 and the end of the tube 12.

Figure 14:
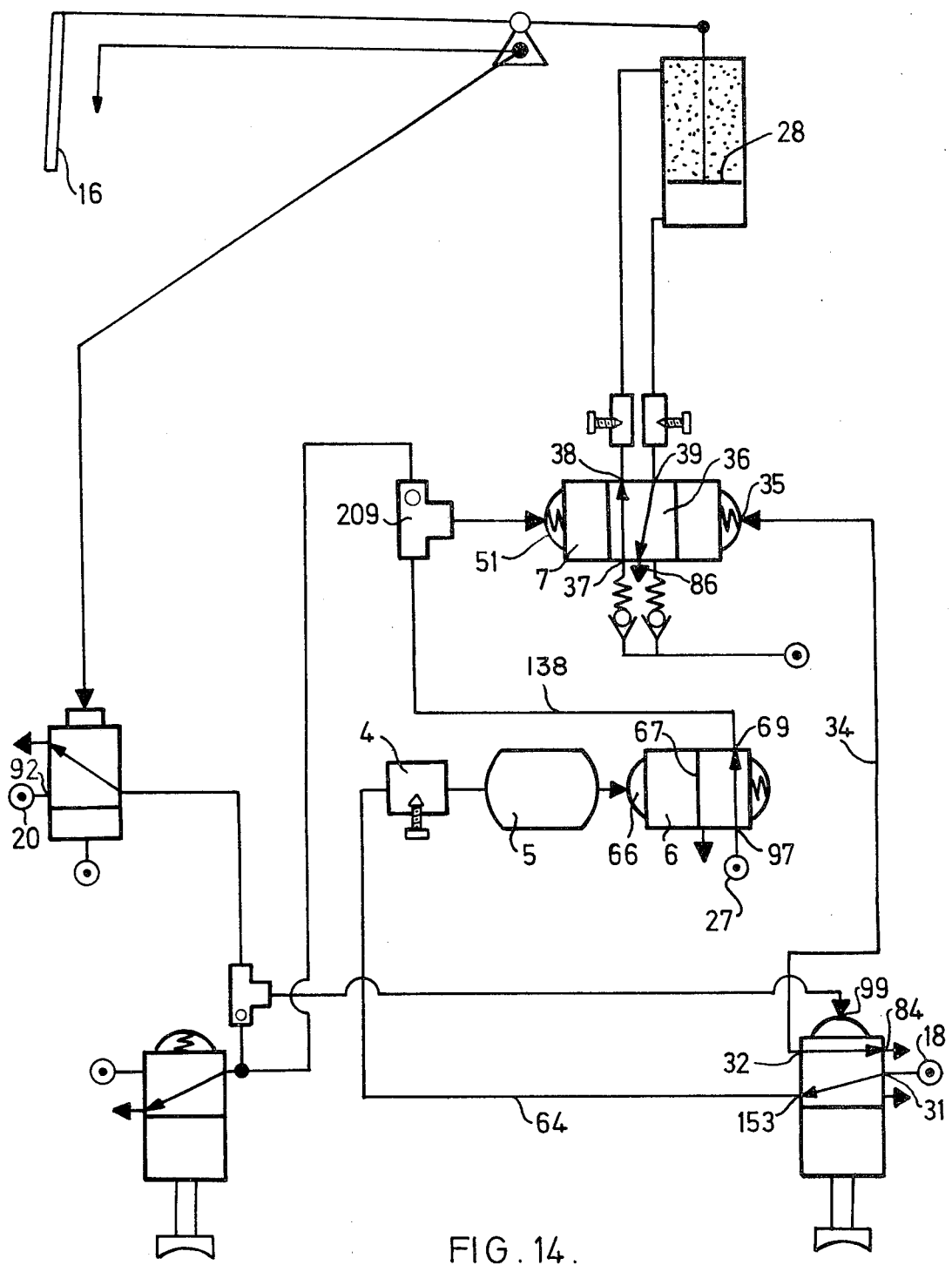

D. Delayed return (FIG. 14).

It has already been stated above that under the effect of the pressure originating from the source 20 the counter push-button 99 thrusts the slide valve 33 back and puts the orifices 32 and 84 in communication. The slide valve 33 has a second effect, i.e. of establishing communication of the orifice 153 with the orifice 31 and consequently with the source 18. The air pressure that has thus appeared at the orifice 153 again propagates through the connecting line to the valve 4, to the reservoir 5, and to the pneumatic push-button 66 of the distributor 6. The slide valve 67 then moves rowards the right at the end of a period depending on the time necessary for refilling the reservoir 5 up to the desired pressure (this time can easily be regulated by the neddle valve 4). The displacement of the slide valve 67 to the right brings about the communication of the supply 27 with the orifice 69 through the orifice 97 and from there, the connecting line 138 to the fluid excluder or valve 209 and the push-button 51 of the distributor 7. At this moment, the push-button 35 is connected to the free air via the connecting line 34 and the orifice 32 and 84 and the slide valve 36 again moves towards the right, which on the one hand keeps communication open between the orifices 37 and 38 and consequently maintains pressure on the upper face of the piston 28 and on the other hand re-establishes communication of the orifice 39 with the orifice 86 which is connected to free air and consequently also connects to free air the lower face of the piston 28. By this fact, at the end of a time necessary for the push-button 66 to displace the slide valve 67, the piston 28 begins a descending movement to which corresponds a rising movement of the probe 16. As soon as the rising movement has ended, the entire device has returned to its initial position and can be used again.

The device described above also allows manual intervention in the automatic sequence described above, at any time, as is described below with reference to FIG. 15.

If one presses the manual push-button 29, the slide valve 46 effects communication of the source 19 with the orifice 48 via the orifice 45. The pressure which has appeared at the orifice 48 propagates on the one hand towards the push-button 99 via the valve 208 (the sphere 182 is at an orifice 156) and on the other hand via the valve 209 to the push-button 51 of the distributor 7.

If the push-button 29 has been pressed down only for a short moment (dictated by experience), the appearance of the pressure at 51 allows the slide valve 36, which is in the position shown in FIG. 12 (that is to say, the position corresponding to the rising movement of the piston 28) to move towards the right to its median position of equilibrium (corresponding to the position taken in FIG. 13), whereas the counter push-button 99 has thrust back the push-button 30, re-connecting to free air the pneumatic push-button 35 via the connecting line 34 and the orifices 32 and 84. At this moment the manual push-button 29 is released, it returns to its initial position under the effect of a mechanical push-button (spring) 152 and the push-button 51 is again in communication with the free air via the valve 209 and the orifices 48 and 47. It follows that the two faces of the piston 28 are subjected to pressure of the source 26, as indicated in FIG. 13, and the piston is arrested immediately in the position which it occupies at that moment in the cylinder.

If the push-button 29 has been pressed down for too long a period the pressure which has appeared at the push-button 51, following the process described above, exerts its effect for too long a period on the slide valve 36 which is occupying the extreme right position of equilibrium (FIG. 15), to which corresponds (as long as the push-button 29 remains pressed down) the subjecting again to pressure of the upper face of the piston 28 via the orifice 78 the neddle valve 110 38 the orifice 37, and the non-return valve 195 and the source 26, whereas the lower face of the piston 28 is connected to the free air via the orifice 89, the neddle valve 111 and the orifices 39 and 86. By this fact the piston begins a descending movement (rising again of the probe 16) while the push-button 29 remains pressed down which allows at will either lifing of the probe 16 by stages or its complete raising at any moment after it has commenced its initial descending movement.

The examples described above shown how the sequence imposed by means of a pneumatic automatic device can be produced. It is obvious that one can produce this same sequence by means of similar circuitry but using energy sources of another type, without thereby going beyond the scope of the present invention.

It is of interest to note that by reason of the fact that one is not limited by the strength of the manipulator as is the case with manual operations, it is possible to carry out simultaneously several samplings and measurements in the course of a single refining operation. Thus, for instance, it is possible to effect simultaneously and successfully temperature measurement and sampling of the steel, as well as other operations such as, for instance, a sampling of the slag or a measurement of the oxygen activity.

The device described above can also be used for carrying out operations othe then sampling and measuring operations, for example blowing operation with a gas or any fluid at a pre-arranged height above the bath of liquid metal. All that need be done is to replace the sampling or measuring probe by a suitable treatment probe which moves with the excape tube 12 and is arranged in relation to the tube in such a manner that at the moment of contact of the tube with the molten bath the end of the treatment probe is at the desired height above the bath; the operation of the device remains unchanged even in the case of its use with such a treatment probe intended, for instance, for blowing or for supplying or pouring any fluid into the bath during a pre-arranged period and at a prearranged height calculated from the upper level of the molten bath. Such applications remain within the scope of the invention.

We claim:

1. A device for carrying out a measuring, sampling, or treating operation upon a bath of molten metal in a receptacle, the device comprising:
   a. a probe for performing a measuring, a sampling, or treating operation:
   b. a carrier on which the probe is mounted;
   c. a support structure on which the probe-carrier is movably mounted, movement of the probe-carrier allowing the insertion of the probe into the receptacle and its withdrawal from the receptacle;
   d. automatic means for inserting the probe into the receptacle by motion of the probe-carrier;
   e. automatic means for arresting the motion of the probe-carrier, during insertion, when the probe is at a predetermined position relative to the surface of the bath in the receptacle, the automatic arresting means including means for locating the surface of the bath, arranged to move conjointly with the probe; and
   f. automatic means for withdrawing the probe from the receptacle by motion of the probe-carrier when a predetermined length of time has elapsed since the arresting of the motion of the probe-carrier during insertion.

2. A device as claimed in claim 1, including a double-acting piston-and-cylinder arrangement mounted on the support structure and linked to the probe-carrier so that motion of the piston relative to the cylinder causes motion of the probe-carrier; means for supplying fluid under pressure to one side of the piston; means for supplying fluid under pressure to the other side of the piston; means for draining fluid from the said one side; means for draining fluid from the said other side; and means for controlling the rate at which fluid is supplied to and drained from the cylinder.

3. A device as claimed in claim 1, in which the automatic means for arresting the motion of the probe-carrier comprises:
   i. a tube arranged to move conjointly with the probe so as to be inserted into the receptacle with the probe, one end of the tube being open, the other end being connected to a source of fluid under pressure;
   ii. automatic means for detecting and increase in pressure within the tube due to the closure of the open end of the tube by the bath; and
   iii. automatic means for arresting the motion of the probe-carrier in response to the detection of the increase in pressure by the automatic detecting means.

4. A device as claimed in claim 1, in which the automatic means for arresting the motion of the probe-carrier comprises:
   i. a tube arranged to move conjointly with the probe so as to be inserted into the receptacle with the probe, one end of the tube being open;
   ii. automatic means connected to the other end of the tube to detect an increase in pressure within the tube as a result of the entry of the bath by the tube; and
   iii. automatic means for arresting the motion of the probe-carrier in response to the detection of the increase in pressure by the automatic detecting means.

5. A device as claimed in claim 4, in which the end of the tube which enters the bath comprises material which evolves gas when it comes into contact with the bath.

6. A device as claimed in claim 1, in which the automatic withdrawing means is operatively connected with the automatic arresting means via delay means arranged to introduce a predetermined delay between the arresting of the probe and the withdrawal of the probe.

7. A device as claimed in claim 1, in which the automatic withdrawing means move the prove to a position which is the same as its initial position before the operation of the automatic inserting means.

8. A device as claimed in claim 1, in which the various means operate pneumatically.

9. A device as claimed in claim 1, further comprising manually operable means for arresting the motion of the probe-carrier.

10. A device as claimed in claim 1, further comprising manually operable means for moving the probe-carrier.

* * * * *